(12) United States Patent
Williams

(10) Patent No.: US 9,022,358 B2
(45) Date of Patent: May 5, 2015

(54) TWO SPEED DIRECT DRIVE DRAWWORKS

(75) Inventor: Kevin R. Williams, Houston, TX (US)

(73) Assignee: Canrig Drilling Technology Ltd., Houston, TX (US)

( * ) Notice: Subject to any disclaimer, the term of this patent is extended or adjusted under 35 U.S.C. 154(b) by 0 days.

(21) Appl. No.: 13/821,300

(22) PCT Filed: Sep. 7, 2011

(86) PCT No.: PCT/US2011/050622
§ 371 (c)(1),
(2), (4) Date: May 24, 2013

(87) PCT Pub. No.: WO2012/033793
PCT Pub. Date: Mar. 15, 2012

(65) Prior Publication Data
US 2013/0240808 A1    Sep. 19, 2013

(51) Int. Cl.
*B66D 1/12* (2006.01)
*E21B 19/00* (2006.01)
*H02K 3/28* (2006.01)
*H02P 3/22* (2006.01)
*H02P 25/18* (2006.01)
*H02K 21/14* (2006.01)
*G05B 11/01* (2006.01)
*H02P 3/12* (2006.01)
*H02P 7/06* (2006.01)
*H02K 1/32* (2006.01)

(52) U.S. Cl.
CPC .............. *B66D 1/12* (2013.01); *E21B 19/008* (2013.01); *H02K 3/28* (2013.01); *H02P 3/22* (2013.01); *H02P 25/188* (2013.01); *H02K 21/14* (2013.01); *H02K 1/32* (2013.01); *G05B 11/01* (2013.01); *H02P 3/12* (2013.01); *H02P 7/06* (2013.01)

(58) Field of Classification Search
USPC ......................................................... 254/362
See application file for complete search history.

(56) References Cited

U.S. PATENT DOCUMENTS

| 4,211,963 | A | * | 7/1980 | Muller ..................... 318/400.41 |
| 5,848,634 | A | * | 12/1998 | Will et al. .................... 160/310 |
| 7,556,241 | B2 | * | 7/2009 | Geagan ......................... 254/342 |
| 7,633,248 | B1 | | 12/2009 | Williams |
| 2002/0121823 | A1 | | 9/2002 | Gauthier |
| 2008/0116432 | A1 | * | 5/2008 | Folk et al. ..................... 254/362 |
| 2008/0203734 | A1 | | 8/2008 | Grimes et al. |
| 2009/0322165 | A1 | * | 12/2009 | Rittenhouse .................... 310/43 |

FOREIGN PATENT DOCUMENTS

WO    00/76054 A1    12/2000

OTHER PUBLICATIONS

Extended European Search Report for European Application No. 10 84 2637, mailed on May 27, 2013 (5 pages).

* cited by examiner

*Primary Examiner* — Emmanuel M Marcelo
(74) *Attorney, Agent, or Firm* — Adolph Locklar

(57) ABSTRACT

A direct drive drawworks (100) has a permanent magnet motor (40) with a first set of windings (250) and a second set of windings (252), a shaft (41) extending from the permanent magnet motor (40) such that the permanent magnet motor directly rotates the shaft (41), a drum (43) connected to the shaft (41) away from the permanent magnet motor (40) such that the rotation of the shaft (41) causes a corresponding rotation of the drum (43), and a switch cooperative with the first set of windings and the second set of windings so as to cause the sets of windings to be selectively connected in parallel or in series.

20 Claims, 8 Drawing Sheets

TWO SPEED DIRECT DRIVE DRAWWORKS

FIELD OF THE INVENTION

The present invention relates to oil field equipment. More particularly, the present invention the relates to a drawworks used in oil and gas drilling and production. More particularly, the present invention relates to a drawworks having a permanent magnet motor. Additionally, the present invention relates to permanent magnet motor drive systems that are capable of selectively operating at two different speeds.

BACKGROUND OF THE INVENTION

A drawworks is a common piece of oil field equipment that is used in oil and gas drilling and production. A drawworks is typically mounted near an oil rig. A common function of a drawworks is to raise and lower drill pipe and casing out of and into a wellbore. A drawworks can be referred to as a hoist or a winch. There are many different sizes of drawworks that are used in the drilling and mining industries. The sizes of the drawworks are reflected in the power ratings for such drawworks. These drawworks share similar operating modes and similar equipment.

Drawworks are used in the hoisting and lowering of loads, such as drill pipe, when inserting and extracting the drill pipe into and out of the open well. The extraction of the pipe can require extracting in excess of 30,000 feet of pipe in order to change drill bits or tooling during the drilling operation. During typical oil well drilling operations, the drill pipe is often hoisted and lowered many times.

During mining operations, similar equipment is used in hoisting coal, overburden material, sand and gravel, phosphates and other minerals. These are just a few of the typical operations in which the drawworks are utilized. In mining operations, a bucket is often lowered for the purposes of allowing the loading of the bucket with the materials. After the bucket is loaded, the drawworks is used so as to hoist the loaded bucket to an elevation whereby the bucket is unloaded at a location above the earth.

FIG. 1 shows a conventional drilling rig 10 that utilizes a prior art drawworks 26. The drawworks 26 is mounted to the rig floor 12 within the interior of the oil derrick 11. The drawworks 26 has a wire line 24 extending around the pulley 25 so as to raise and lower drill pipe 14 from and to the wellbore 16. The pulley 25 is also known as a crown block. The wellbore 16 is formed in the earth 50. The drill pipe 14 can be a drillstring that is a series of drill pipes extending within the wellbore 16 in the earth 15. Individual drill pipe 14 is connected to the drillstring at threaded joint 17. Portions of the drillstring may have stabilizer portions that include stabilizer elements 18 that extend helically along the outer surface of the pipe 14 so as to engage the wall of the wellbore 16 in a manner that centers the pipe 14 therein.

The drawworks 26 extends and retracts wire line 24 over the pulley 25 that is mounted on the oil derrick 11 so as to raise and lower the drilling unit 19 that holds the drillpipe 14. The line 24 is connected to traveling block 23. The traveling block 23 is suspended and moved upwardly and downwardly by the line 24 which is extended and retracted by the drawworks 26. The traveling block 23 is connected to the drilling unit 19. The drilling unit 19 has a swivel 22 at its upper end to which drilling fluid is introduced into the drill pipe 14, and by which the drilling unit 19 is suspended from the traveling block 23. The drilling unit 19, pipe handler 21, and the associated connected parts move vertically along axis 20. The vertical movement is guided by two vertical guide rails 27, or tracks, that are rigidly attached to the derrick 11. The drilling unit 19 is attached to a carriage 28. The carriage 28 has rollers that engage the rails 27. The rails 27 guide the carriage 28 for vertical movement upwardly and downwardly along the rails 27 parallel to vertical axis 20. The drill pipe 14 is inserted into and removed from the wellbore 16 through the wellhead 13.

The drawworks 26 typically has a hollow drum, a shaft that connects the drum to a motor, a transmission positioned between the motor and the drum, and a braking system for slowing the rotation of the drum. The drawworks 26 is mounted on the floor 12 of the drilling rig 10. The longitudinal axis of the drum and shaft is parallel to the drill floor 12. Typical motors used on the drawworks 26 are AC electric motors, DC electric motors, and diesel combustion engines. Power is typically transmitted from the motor to the shaft by a chain transmission mechanism or a gear transmission mechanism. The braking system can use a variety of techniques for braking the drum. The braking system can use disc brakes, band brakes, water-cooled brakes, or electric brakes. As the line 24 is retracted by the drawworks 26, the line 24 is wrapped around the drum of the drawworks 26. The wrapping of the line 24 around the drawworks 26 is similar to wrapping a thread around a spool.

The use of a transmission causes many problems commonly associated with the typical drawworks. A transmission is costly, adds weight to the drawworks, and needs periodic repair. Maintenance of a transmission can be costly, especially in the event of a total failure of the transmission. Power is also lost with the use of a transmission due to frictional forces that are inherent in the use of transmissions. Typical drawworks 26 also use large amounts of energy for changing the direction of rotation of the drawworks 26. Thus, there is a need for a simple design of a drawworks that is lighter, easier to maintain, uses less energy, and is more energy efficient.

In the past, various patents have issued relating to drawworks. For example, U.S. Pat. No. 6,182,945, issued on Feb. 6, 2001 to Dyer, et al., discloses a fully redundant drawworks with two complete and totally independent systems for controlling and powering the drum and the drum shaft of the drawworks. Each system has at least one power source, a power transmission, and a coupler connected to the power source and to the transmission and to the drum shaft. Each system has a braking system, such as disc brakes, band brakes, electric brakes, or water-cooled brakes. In the event that any component of either system fails, the fully redundant drawworks has the ability to raise drillpipe from a wellbore so as to avoid the risk of a "stuck" drill pipe.

U.S. Pat. No. 4,226,311, issued on Oct. 7, 1980 to Johnson et al., discloses a disc-type brake apparatus adapted for installation in combination with the drawworks of a wellbore drilling operation. The apparatus automatically senses any reverse torque situation in the drill pipe and quickly sets the brake for precluding transmission of any reverse torque to the rotary table device clutch mechanism therefor.

U.S. Pat. No. 3,653,636, issued on Apr. 4, 1972 to Burrell, discloses a reversible hydraulic motor and a high-pressure/low-pressure hydraulic reservoir system that are used to counterbalance the weight of a drillstring or other well equipment suspended from a line wound on a drawworks positioned on a floating vessel. A load cell controls the torque output and the direction of the output drive of the hydraulic motor. Upon downward movement of the floating vessel, high pressure hydraulic fluid from an accumulator moves through the hydraulic motor into a low pressure hydraulic fluid reservoir to provide increased torque to the drawworks as the drawworks spools a wire line upward. Upon an upward movement of the floating vessel, the hydraulic motor reverses so as to move low pressure fluid from the low pressure reservoir to the high pressure accumulator. This decreases torque and reverses direction to the drawworks as the drawworks extends the line.

U.S. Patent Publication No. 2008/0116432, published on May 22, 2008 to Folk et al., discloses a winch that includes an electric motor having a fixed stator, and a cylindrical rotor which rotates about the stator. A drum is affixed to the rotor and carries a cable which is wound or unwound by the winch. The winch may be a drawworks for an oil rig. The electric motor can be a permanent magnet electric motor. A bearing mechanism is positioned between the motor stator and the motor rotor.

U.S. Pat. No. 3,211,803, issued to Pryor et al., discloses a generator-feed electric drive for a drawworks that has electric motors, a driving connection between the motors and the drawworks, a generator, an electrical connection to the generator and the motors for supplying electricity to the motors, an engine, and a connection between the engine and the generator for supplying power to the generator. The electric motors have a total power absorption capacity that is substantially larger than the power output capacity of the engine, whereby the torque available to drive the drawworks is substantially greater than would be available from motors having a total power absorption capacity equal to the power output capacity of the engine.

U.S. Pat. No. 4,438,904, issued on Mar. 27, 1984 to White, discloses a drawworks that has a drilling platform supporting the drawworks, a cable-drum shaft rotatably supporting the cable drum between two upright support-wall members, an input shaft, a driving mechanism for driving the input shaft in rotation, a clutch-controlled chain sprocket and chain transmission for causing rotation of the drum shaft and the cable drum at any of multiple speeds in response to rotations of the input shaft, and a controller disposed outside of one of the support-wall members. The drum shaft has an extension beyond one of the support-wall members. A single outboard brake is fixed to the drum-shaft extension.

U.S. Pat. No. 6,029,951, issued on Feb. 29, 2000 to Guggari, discloses a system and method for the use of a drawworks where the drawworks has a rotatable drum on which a line is wound. The drawworks and the line are used for facilitating a movement of a load suspended on the line. A drawworks-control system monitors and controls the drawworks. A brake arrangement is connected to the rotatable drum for limiting the rotation of the rotatable drum. An electrical motor is connected to the rotatable drum for driving the rotatable drum. The drawworks control system provides a signal that is representative of the calculated torque value of the electrical motor wherein pre-torquing is generated in the electrical motor in response to the signal. Control of the rotation of the rotatable drum is transferred from the brake arrangement to the electrical motor when the electrical motor pre-torquing level is substantially equal to the calculated torque value.

U.S. Pat. No. 4,046,355, issued on Sep. 6, 1977 to Martin, discloses a control apparatus for use with a drawworks assembly that has a work piece suspended from, and applying tension to, a cable. One end of the cable is wound on a drum. The rotation of the cable is controlled by a power brake mechanism. The control apparatus has a cable tension sensor that produces a tension signal proportional to the tension in the cable. A pulse generator produces a pulsed control signal. A brake control applies the tension signal to the power brake mechanism in response to the control signal.

U.S. Patent Application No. 60/726,077, filed on Oct. 13, 2005 by the present inventor, discloses a drawworks for drilling and mining operations. The drawworks has a wire rope drum which is driven by at least one AC motor. A drive shaft couples a brake with the wire rope drum. The motor is operated from a utility power supply. The drawworks has a flywheel system that stores energy while braking the rotation of the wire rope drum of the drawworks. Energy stored in the flywheel is used to begin another rotation of the wire rope drum.

When drawworks are used in the drilling of oil and gas well, the speed of the drawworks will vary dependent on the weight of the load. For heavy loads, where the torque demand is high, the required speed of hoisting or lowering the load (pipe) is low. For an empty block or for very light loads (e.g. short pipe lengths), the required speed increases. As such, it would be desirable to have a permanent magnet motor associated with the drawworks that could have a high speed and a low speed. Such a high speed and a low speed, under constant power conditions, could provide either enhanced torque or reduced torque depending upon the requirements of the load.

In the past, patents have issued relating to permanent magnet motors. For example, U.S. Pat. No. 4,910,790, issued on Mar. 20, 1990 to P. A. Kerashaw, shows a two-speed permanent magnet D.C. electric motor. This D.C. electric motor has a housing, permanent magnets carried by the housing, and an armature assembly installed in the housing. The armature assembly has a shaft rotatably mounted in the housing, first coil windings, a first commutator connected to the first coil windings, second coil windings and second commutator connected to the second coil windings. A first set of brushes is carried by the housing and engages the first commutator for applying a D.C. voltage to the first coil windings to cause rotation of the armature assembly at a first speed. A second set of brushes is carried by the housing and engages the second commutator for applying the same D.C. voltage to at least the second coil windings to cause rotation of the armature assembly at a second speed.

U.S. Pat. No. 5,952,757, issued on Sep. 14, 1999 to J. H. Boyd, describes a line start permanent magnet motor. This motor has a stator with a stator core, a start winding, and first and second main windings. The first main winding and the start winding are configured to form a lower number of poles than the second main windings. The stator core forms a stator bore. The motor also includes a rotor having a rotor shaft concentrically arranged axially of the stator core and a rotor core positioned concentrically with the rotor shaft. Secondary conductors are arranged axially of the rotor shaft and extend through the rotor core. A plurality of permanent magnets are located at an outer periphery of the rotor core and are magnetized to form a number of poles equal to the number of poles formed by the second main winding.

Additionally, where permanent magnet motors would be used for the direct drive of the drawworks, it is important to be able to avoid the adverse effects of a sudden loss of power. Due to the fixed field flux inherent in permanent magnet motors, when there are overhauling loads and the AC mains are disconnected, no power is applied to the windings of the motor. As such, a "runaway condition" due to the overhauling load of a weight being suspended in free, open air can occur. This can result in a crash of the heavy load freely falling via weight and the earth's gravity. As such, damage can occur and safety concerns can arise for rig personnel. As such, a need has developed whereby the permanent magnet motor can be made inherently safe so as to avoid any such "runaway conditions".

It is an object of the present invention to provide a direct-drive drawworks.

It is another object of the present invention to provide a drawworks that requires no gearing mechanism.

It is another object of the present invention to provide a drawworks that has a very high power density.

It is another object of the present invention to provide a drawworks that is relatively light weight.

It is still another object of the present invention to provide a drawworks that can be easily transported on conventional road systems.

It is another object of the present invention to provide a drawworks which has minimal assembly requirements in the oil field.

It is another object of the present invention to provide a drawworks that is easily replaceable in the oil field.

It is still another object of the present invention to provide a drawworks that has reduced inertial effects.

It is another object of the present invention to provide a drawworks that reduces costs of operating and repair.

It is a further object of the present invention to provide a permanent magnet direct drive drawworks in which the permanent magnet motor can be operated at a high speed or a low speed.

It is still another object of the present invention to provide a permanent magnet direct drive drawworks that allows the speed of the motor to be adapted to various load conditions affecting the drawworks.

It is still another object of the present invention to provide a permanent magnet direct drive drawworks which effectively prevents any runaway conditions from occurring because of an overhauling load or a loss of power.

These and other objects and advantages of the present invention will become apparent from a reading of the attached specification and appended claims.

BRIEF SUMMARY OF THE INVENTION

The present invention is a direct drive drawworks that has a permanent magnet motor with a first set of windings and a second set of windings, a shaft extending from the permanent magnet motor such that the permanent magnet motor directly rotates the shaft, a drum connected to the shaft away from the permanent magnet motor such that the rotation of the shaft causes a corresponding rotation of the drum, and a switch cooperative with the first set of windings and the second set of windings so as to cause the sets of windings to be selectively connected in parallel or in series.

A processor is connected to the switch for switching between the parallel connection and the series connection relative to a condition affecting the load on the shaft and the drum. The processing means serves to switch to the parallel connection when the load on the drum is at a first amount and to switch to the series connection when the load on the drum is a second amount. The second amount of load would be greater than the first amount of load.

In the present invention, an AC power supply is electrically connected to the permanent magnet motor. A variable frequency drive is electrically interconnected between the AC power supply and the permanent magnet motor. A resistive load bank is electrically interconnected between the AC power supply and the permanent magnet motor. A transfer switch serves to directly electrically connect the resistive load bank to the permanent magnet motor upon a condition occurring. This condition can be an interruption of power from the power supply to the permanent magnet or an overload condition affecting the drum. The resistive load bank can include dynamic braking resistors.

The permanent magnet motor has a first speed when the switch connects the sets of windings in parallel. The permanent magnet motor has a second speed when the switch connects the sets of windings in series. The first speed is greater than the second speed. In the preferred embodiment of the present invention, the first speed is approximately twice the second speed.

In the permanent magnet motor of the present invention, there is a first set of windings and a second set of windings in a configuration such that these can be connected for a nominal base voltage when in a series connection or for being connected for a nominal voltage of half that amount when in a parallel connection. The two different connections are selectable by a manual selector switch or automatically selected by a processor controlled by the drilling control system. When connected in a parallel arrangement, the frequency is increased to twice nominal frequency. When rated current and nominal voltage are applied, twice the nominal speed is achieved at normal power ratings. In this manner, an effective two speed drawworks is achieved.

It should be noted that overspeed conditions above twice nominal are still achievable based upon the particular drive manufacturer's drive characteristics and performance.

The present invention implements a over-speed detector to open the power supply (i.e. the variable frequency drive system power circuit) and instantaneously insert dynamic braking resistors or a "load bank" so as to absorb the kinetic energy of the rotating drum of the winch or drawworks that is produced from the potential energy from a weight or a "load" (i.e. the drill string and associated traveling and drilling equipment suspended from the drawworks hook) in order to slow down this condition. This ensures a maximum safer speed limited relative to the associated load of the weight (known as "weight-on-bit" or the free suspended weight of the drill string and related drilling equipment). As such, the load is prevented from crashing when in a runaway condition.

The unique two speed permanent magnet motor drawworks is achieved by special connections of a permanent magnet motor design. The control and selection of speeds is selectable and controllable by a user-friendly selector switch or can be electronically-controlled by way of a computer. It can also be controlled by a processor by way of the drilling control system. A constant power is achieved for selection of the speed so as to be perfectly applied for drawworks applications. The motor windings can be connected in a series or parallel configuration through power switching devices and properly controlled. When the parallel selection occurs, the voltage of the motor windings will require one-half of the nominal voltage. Therefore, by operation of twice-rated frequency and at rated voltage (i.e. each set of parallel windings paralleled windings sees double nominal voltage), the speed is twice the nominal value. When in the series configuration, with nominal voltage and nominal frequency applied, the speed is one-half that of the paralleled connections. The frequency remains at nominal, but the power is constant so as to produce nominal torque that is twice that of the paralleled connection.

During runaway conditions or overspeed occurrences, the stator power terminals are immediately disconnected through power switches and connected to a load bank or a resistor network to absorb the lowering power and limit the top speed or maximum speed of the falling load. Due to the inherent characteristics of the field flux being produced from the permanent magnet motor, this dynamic braking system utilizes the driving motor itself as the braking device. As such, the present invention can avoid equipment damage and increase personnel safety.

DETAILED DESCRIPTION OF THE INVENTION

Figure 2:
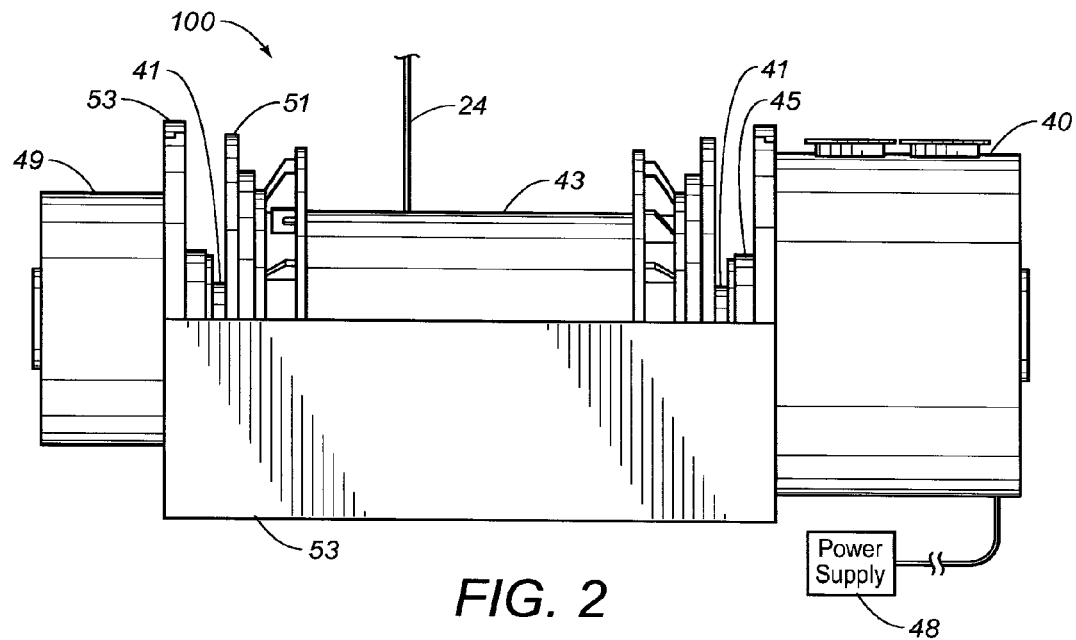
FIG. 2 shows a side elevational view of the preferred embodiment of the permanent magnet direct drive drawworks of the present invention.

Referring to FIG. 2, there is shown a side elevational view of the preferred embodiment of the permanent magnet direct drive drawworks 100 of the present invention. The drawworks 100 has a permanent magnet motor 40. A shaft 41 is connected to the permanent magnet motor 40. A bearing housing 45 is positioned adjacent the permanent magnet motor 40 and the shaft 41. The shaft 41 extends through the bearing housing 45 and into the interior of the motor 40. A drum 43 is attached to the end 47 of the shaft 41 opposite the permanent magnet motor 40. The wire line 24 wraps around the drum 43. The drum 43 is in cradle 53. The cradle 53 supports the shaft 41 so as to hold the drum 43 and motor 40 above the floor surface, e.g. the rig floor 12. A braking system 49 is positioned on a side of the drum 43 opposite the motor 40. In FIG. 2, the braking system 49 has a brake disk 51 positioned adjacent the drum 43. The braking system 49 in FIG. 2 is water-cooled. A power supply 48 is connected to the permanent magnet motor 40 so as to supply power thereto.

The permanent magnet motor 40 rotates the shaft 41 which rotates the drum 43. The rotation of the drum 43 causes the wire line 24 to be extended or retracted depending upon the direction of rotation of the drum 43. When the wire line 24 is retracted, the wire line 24 wraps around the outer surface of the drum 43. A longitudinal axis of the drum 43 is aligned with a longitudinal axis of the shaft 41. The longitudinal axes of the drum 43 and shaft 41 are generally parallel to the rig floor 12.

Figure 3:
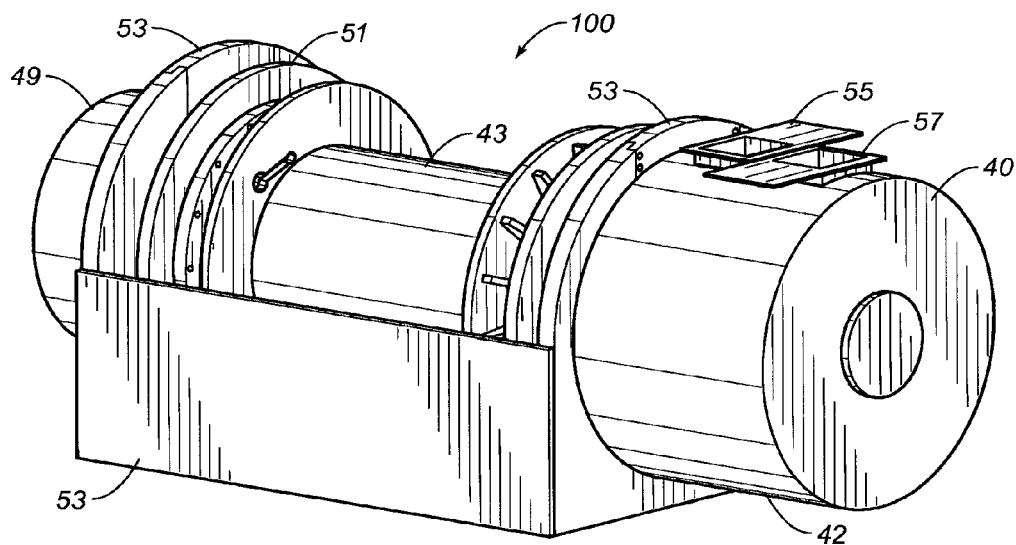
FIG. 3 shows a perspective view of the preferred embodiment of the permanent magnet direct drive of the present invention.

Referring to FIG. 3, there is shown a perspective view of the permanent magnet direct drive drawworks 100 of the present invention. The permanent magnet motor 40 has a housing 42. A rotor and stator are located within the housing 42, as is described in more detail hereinafter. The housing 42 has a generally cylindrical shape. The housing 42 has an inlet 55 and an outlet 57. In order to cool the rotor and stator of the motor 40, air is passed into the inlet 55, circulated in the interior of the housing 42, and discharged through the outlet 57. A cover 50 is affixed to the top surface 44 of the housing 42. The disk 51 of the braking system 49 is positioned adjacent the drum 43 inside the cradle 53. The drum 43 is shaped like a yarn spool so as to efficiently store long lengths of wire.

Figure 1:
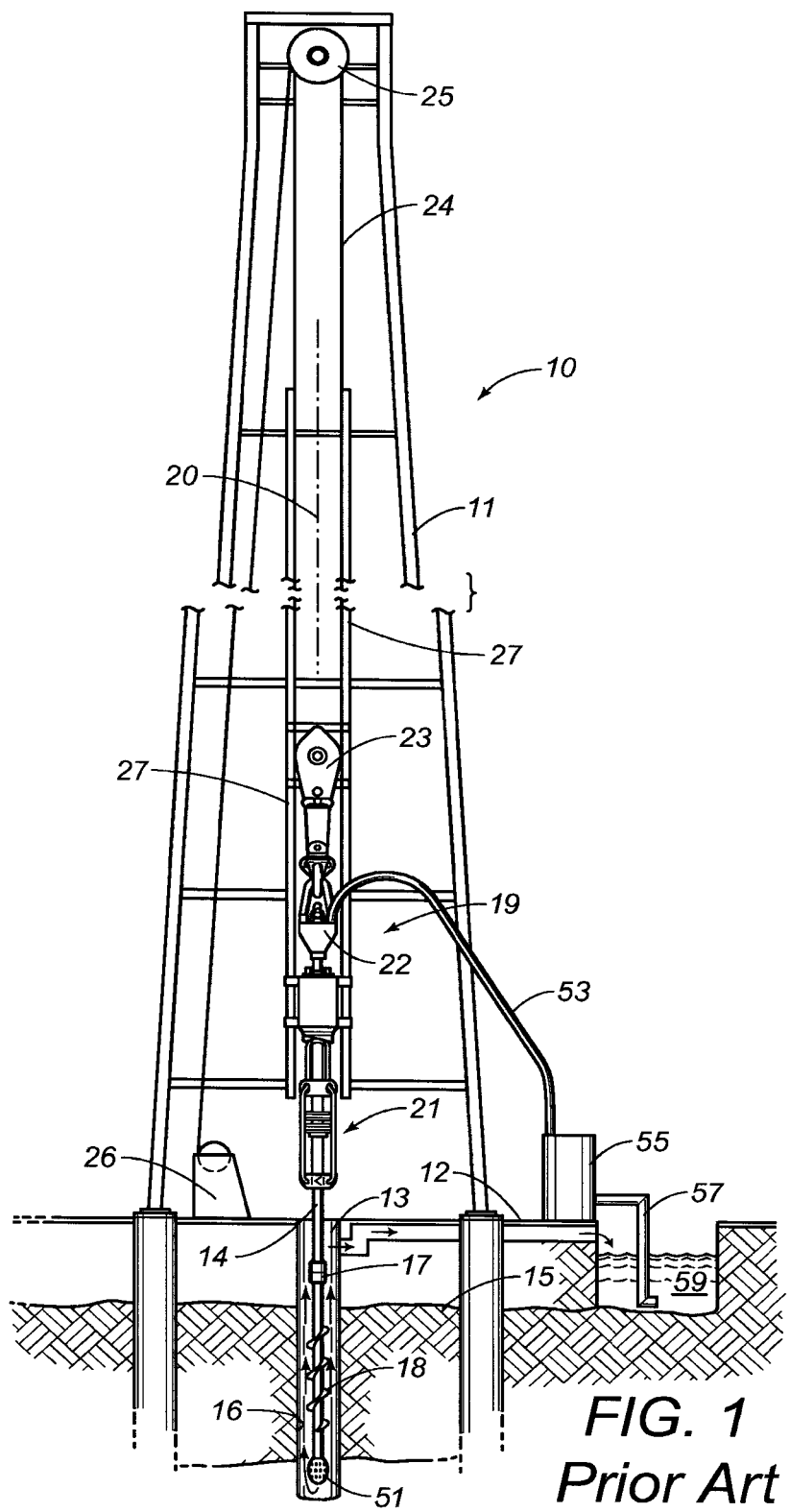
FIG. 1 shows a side elevational view of an oil rig utilizing a prior art drawworks.

The drum 43 has a wire line wrapped therearound. The rotation of the drum 43 serves to pay in and pay out this wire line. The wire line extends from the drum 43 in the manner described herein previously in connection with FIG. 1. As such, the rotation of the drum 43, as caused by the permanent magnet motor 40, can cause the wire line to pay in and pay out for the purpose of lifting or lowering the traveling block.

Figure 4:
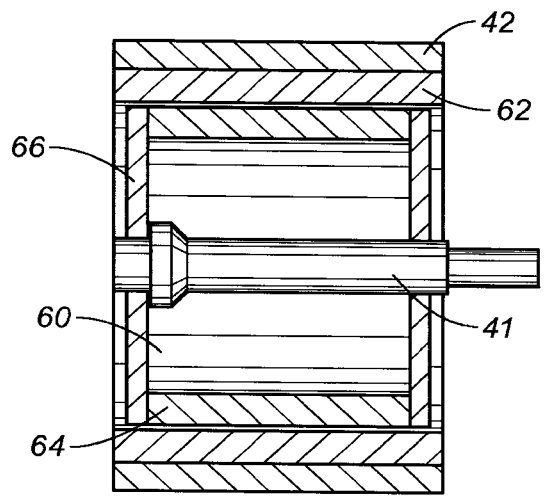
FIG. 4 shows a cross-sectional view of the permanent magnet motor of the present invention.

Referring to FIG. 4, there is shown a cross-sectional view of the housing 42 of the permanent magnet motor 40. As can be seen, the housing 42 defines an interior chamber 60. The shaft 41 extends outwardly of the interior 60 of the housing 42 of the permanent magnet motor 40. A stator 62 is affixed to the wall of the housing 42. The stator 62 extends around the circular interior of the housing 42. A rotor 64 is positioned in close proximity to the stator 62. Rotor 64 has a plurality of permanent magnets formed around a periphery thereof (described in more detail hereinafter). The stator 62 has coils of wire positioned around the inner surface of the stator 62. The interaction of the coils of the stator 62 and the permanent magnets of the rotor 64 provides the rotational power of the permanent magnet motor 40. A drive plate 66 is affixed to the top of the rotor 64. The shaft 41 is engaged with the drive plate 66 so that the rotational energy imparted to drive plate 66 by the rotor 64 will be imparted to the shaft 41. The shaft 41 extends outwardly from the interior chamber 60 of the housing 42. An end of the cradle 53 can be seen as positioned between the bearing housing 45 and the motor 40. Thus, the shaft 41 extends through the motor 40, the cradle 53, and the bearing housing 45.

Permanent magnet motors rotate because of the torque that the interaction of two magnetic fields causes. These magnetic fields are created by the permanent magnets mounted on the rotating rotor and the magnetic field that the stationary windings of the stator induce. The torque is greatest when the magnetic vector of the rotor is at 90° to the magnetic vector of the stator. In this position, it forces the poles of the rotor to rotate in the direction of the stator field. In a trapezoidally-driven brushless-DC motor, a current flow alternating sequentially through two of the three coils generates the stator field. The remaining third coil monitors the back EMF (electromotive force) of the two active coils. Back EMF occurs when a permanent magnet motor rotates. Each winding generates a voltage that opposes the main voltage of the windings. Back EMF depends on the angular velocity of the rotor, the magnetic field that the rotor magnets generate, and the number of turns in the stator windings. The motor's back EMF provides the feedback of the rotor's position with respect to the stator windings. Permanent magnet motors having sensors provide a similar position feedback. With sinusoidal commutation, which permanent magnet synchronous motors use, the drive-control circuitry simultaneously powers the three coils.

Permanent magnet motors have been commercially available since the 1990's. However, permanent magnet motors have not seen widespread use because of the high cost associated with the expensive permanent magnets on the rotor. Additionally, their complex control algorithms require specialized engineering expertise as well as the additional expense of an embedded processor. Permanent magnet motors are more efficient than the AC-induction motors. However, because of the recent rise in the price of copper, the current winding-based induction motors have become more costly and the permanent magnet motors have become comparatively less expensive. Additionally, recent advances in technology have improved the power output of permanent magnet motors to where such motors have a superior power density to that of existing induction motors. As such, the permanent magnet motor 40, as illustrated in FIG. 4, provides superior power output for the direct drive of the shaft 41 and drum 43 of the drawworks 100.

Figure 5:
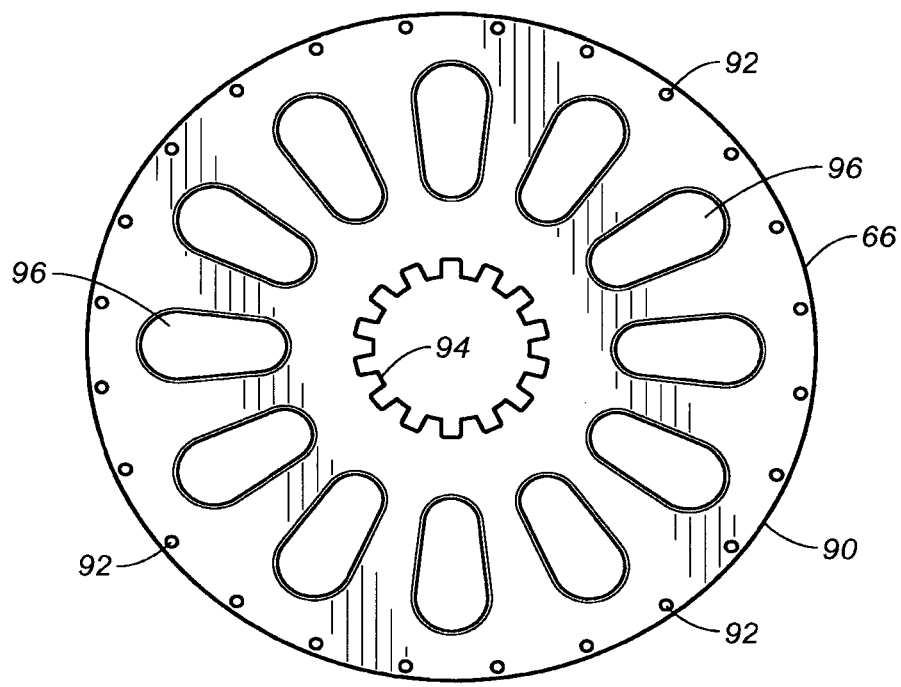
FIG. 5 shows a plan view of the drive plate associated with the permanent magnet motor of the present invention.

Referring to FIG. 5, there is shown a plan view of the drive plate 66 of the permanent magnet motor 40 of the drawworks 100 of the present invention. The drive plate 66 has a circular shape with an outer periphery 90. Bolt holes 92 are formed adjacent to the outer periphery 90. The bolt holes 92 allow for the bolted attachment of the drive plate 66 to the top of the rotor. A splined aperture 94 is formed centrally of the drive plate 66 so as to accommodate the spline of the shaft 41. Air circulation holes 96 are formed around the interior of the drive plate 66. The holes 96 facilitate air circulation within the permanent magnet motor 40.

Figure 6:
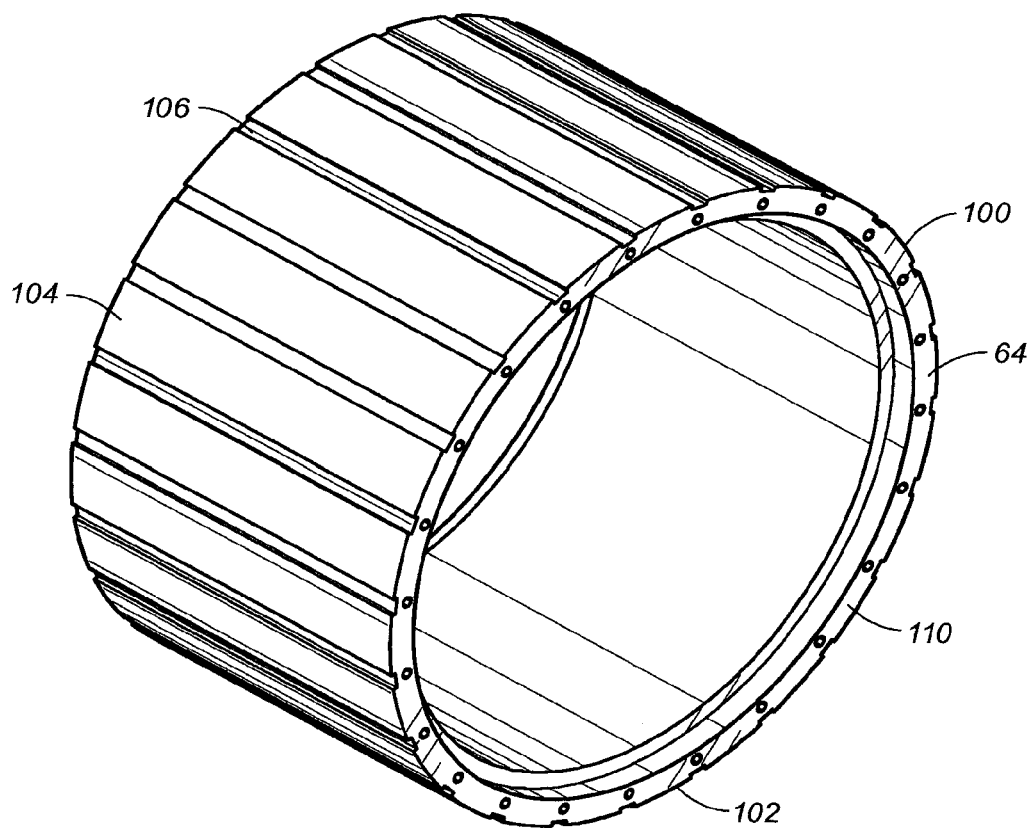
FIG. 6 shows a perspective view of the rotor of the permanent magnet motor of the present invention.

Referring to FIG. 6, there is shown a isolated perspective view of the rotor 64 of the permanent magnet motor 40 of the drawworks 100 of the present invention. The drive plate 66 can be mounted directly onto the top of the rotor 64. Permanent magnet piles are affixed to the outer surface of the rotor 64 in spaced relationship to each other. Spacers 106 serve to isolate one of the permanent magnet piles from an adjacent pile. Spacers 106 can be separate items or they can be simply a formed surface on the outer periphery on the rotor 64. The rotor 64 has a rotor bearing bore 110 formed centrally thereof.

Figure 7:
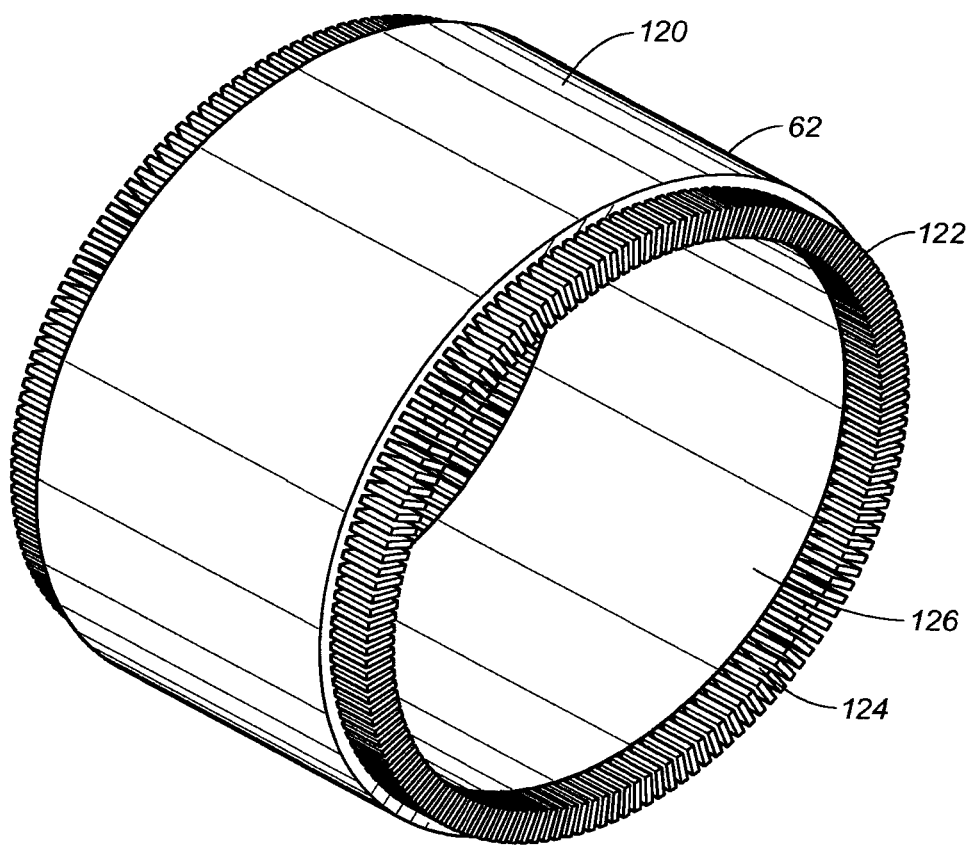
FIG. 7 shows a perspective view of the stator of the permanent magnet motor of the present invention.

Referring to FIG. 7, there is shown a isolated perspective view of the stator 62 of the permanent magnet motor 40 of the drawworks 100 of the present invention. The stator 62 has an outer cover 120 which serves to space the coils 122 from the inner wall of the housing 42. The coils 122 extend radially inwardly therefrom. The interior surface 124 of the coils 122 define a circular aperture into which the rotor 64 is placed. As a result, the permanent magnet piles 104 are in close proximity to the coils 122 so that the permanent magnet motor 40 can operate properly. Suitable electronics are connected to the permanent magnet motor 40 so as to facilitate the proper operation of the permanent magnet motor 40.

In the present invention, it will be appreciated that the permanent magnet direct drive drawworks 100 is directly connected to the shaft 41. As such, there are no gears or other transmission mechanisms that are interconnected in these areas. The drawworks 100 thus provides an enhanced power density for the proper rotation of the drillstring in a relatively lightweight configuration. The weight associated with transmission systems is effectively avoided by the present invention. Furthermore, the complexity of installing such transmission systems so that the power of the induction motor can be transmitted to the drive system is avoided in the present invention. As a result, the permanent magnet direct drive drawworks of the present invention can serve the proper purpose of rotating the drillstring with a minimal weight. Unlike the present motors associated with drilling operations that can weigh in excess of 100,000 pounds, the permanent magnet motor of the present invention will only weigh approximately 60,000 pounds. As such, it can be easily transported over roads on a conventional truck. Unlike the prior art, the motor 40 does not have to be assembled by itself or with the transmission system in the field. As such, the present invention avoids the specialized requirement of installation personnel that would be otherwise required for those systems that require transmissions between the motor and the drawworks. The reduced weight of the permanent magnet motor of the present invention avoids certain inertial effects that would otherwise adversely affect the operation of conventional induction motors. The motor 40 of the present invention can be interchanged, as desired, for use in association with the direct drive top drive of the drilling rig or the mud pump of the drilling rig. Since transmission systems are not required, a supply of such permanent magnet motors can be provided to the drilling operation for use either in association with a drawworks or for other purposes. If there would be a failure of any one motor, then any of the other motors could be substituted therefore without any downtime on the drilling rig.

Figure 8:
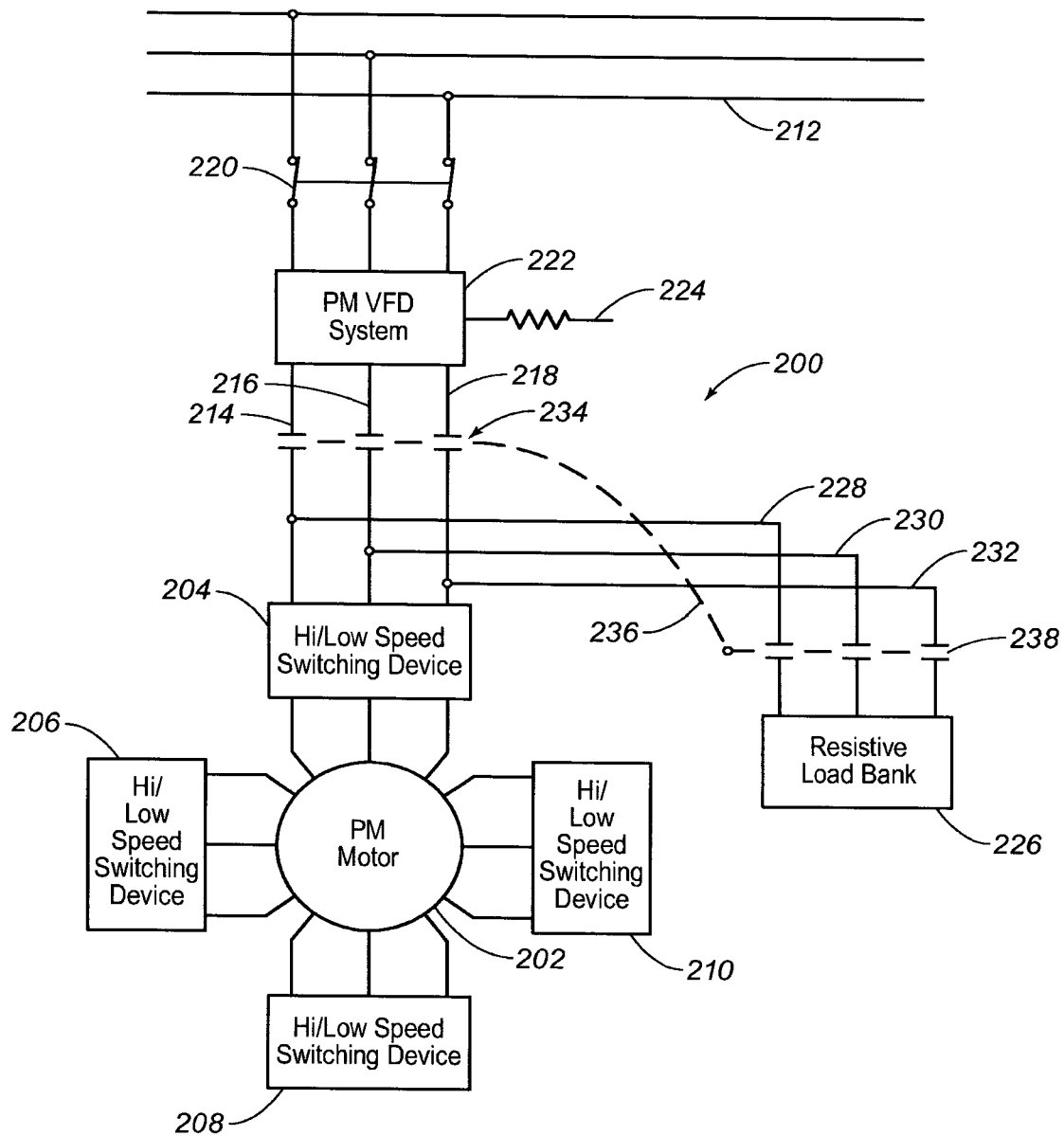
FIG. 8 is a diagrammatic illustration of the two speed permanent magnet direct drive drawworks in accordance with the teachings of the present invention.
Figure 10:
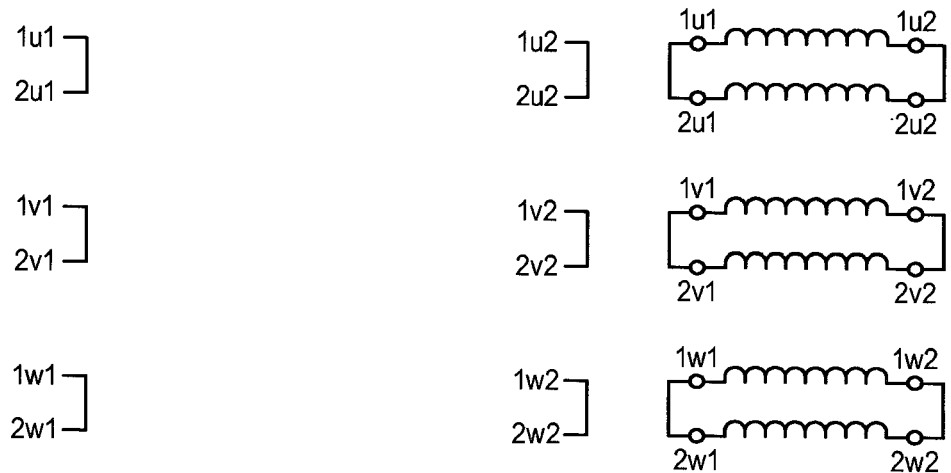
FIG. 10 is a diagram showing the parallel connections from the winding diagram of FIG. 9.
Figure 11:
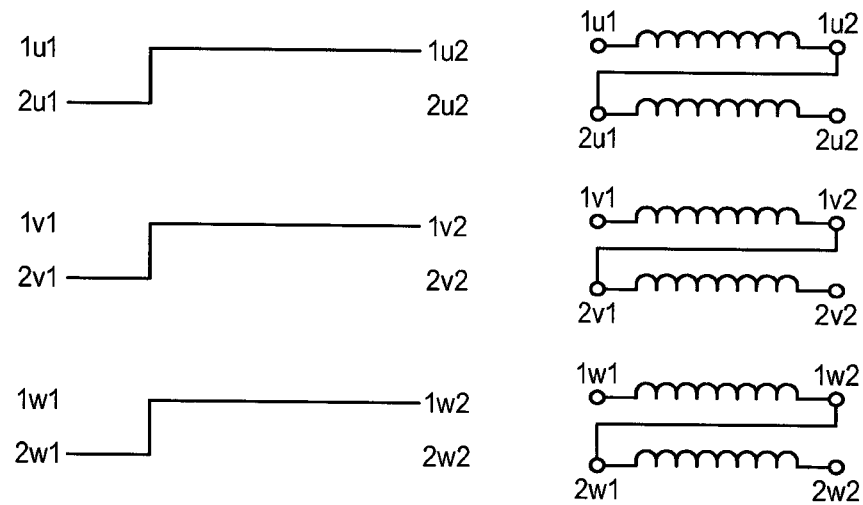
FIG. 11 is a diagram showing the series connections from the winding diagram of FIG. 9.

FIG. 8 shows a diagram of the permanent magnet direct drive drawworks 200 in accordance with the teachings of the present invention. The permanent magnet direct drive drawworks 200 includes a permanent magnet motor 202 having a first set of windings and a second set of windings. The winding diagram, showing the first set of windings and the second set of windings, is provided in FIG. 8. A shaft will extend from the permanent magnet motor in the manner described herein previously such that the permanent magnet motor 202 directly rotates the shaft. A drum is connected to the shaft away from the permanent magnet motor in the manner described herein previously. As such, rotation of the shaft will cause a corresponding rotation of the drum. A switch 204 is cooperative with the first set of windings and the second set of windings so as to cause the sets of windings to be selectively connected in parallel or in series. The parallel connection of the windings is illustrated in FIG. 10 herein. The series connection of windings is illustrated in FIG. 11 herein. As can be seen in FIG. 8, several switching devices 206, 208 and 210 are electrically connected to the permanent magnet motor 202. Each of the switches 204, 206, 208 and 210 can utilize a suitable processor so as to cause the switching action to occur.

In FIG. 8, it can be seen that there is a three phase AC power supply 212. The switching device 204 is electrically connected along lines 214, 216 and 218 to the respective phases of the power supply 212. A main disconnect switch 220 is positioned on lines 214, 216 and 218 so as to selectively allow for a disconnection of the permanent magnet motor 202 from the power supply 212. A variable frequency drive system 222 is also connected to lines 214, 216 and 218. A DC link load bank 224 provides power to the variable frequency drive system.

A resistive load bank 226 is electrically connected by lines 228, 230 and 232 to respective lines 214, 216 and 218. A main motor disconnect switch 234 is provided on lines 214, 216 and 218. In event of power loss or an overhaul load, the main motor disconnect means will connect the permanent magnet motor 202 to the resistive load bank 226. As such, the bypass line 236 will cause the switches 238 to close so as to establish an electrical pathway between the resistive load bank 226 and the permanent magnet motor 202. The resistive load bank 226 can have dynamic braking resistors therein.

Figure 9:
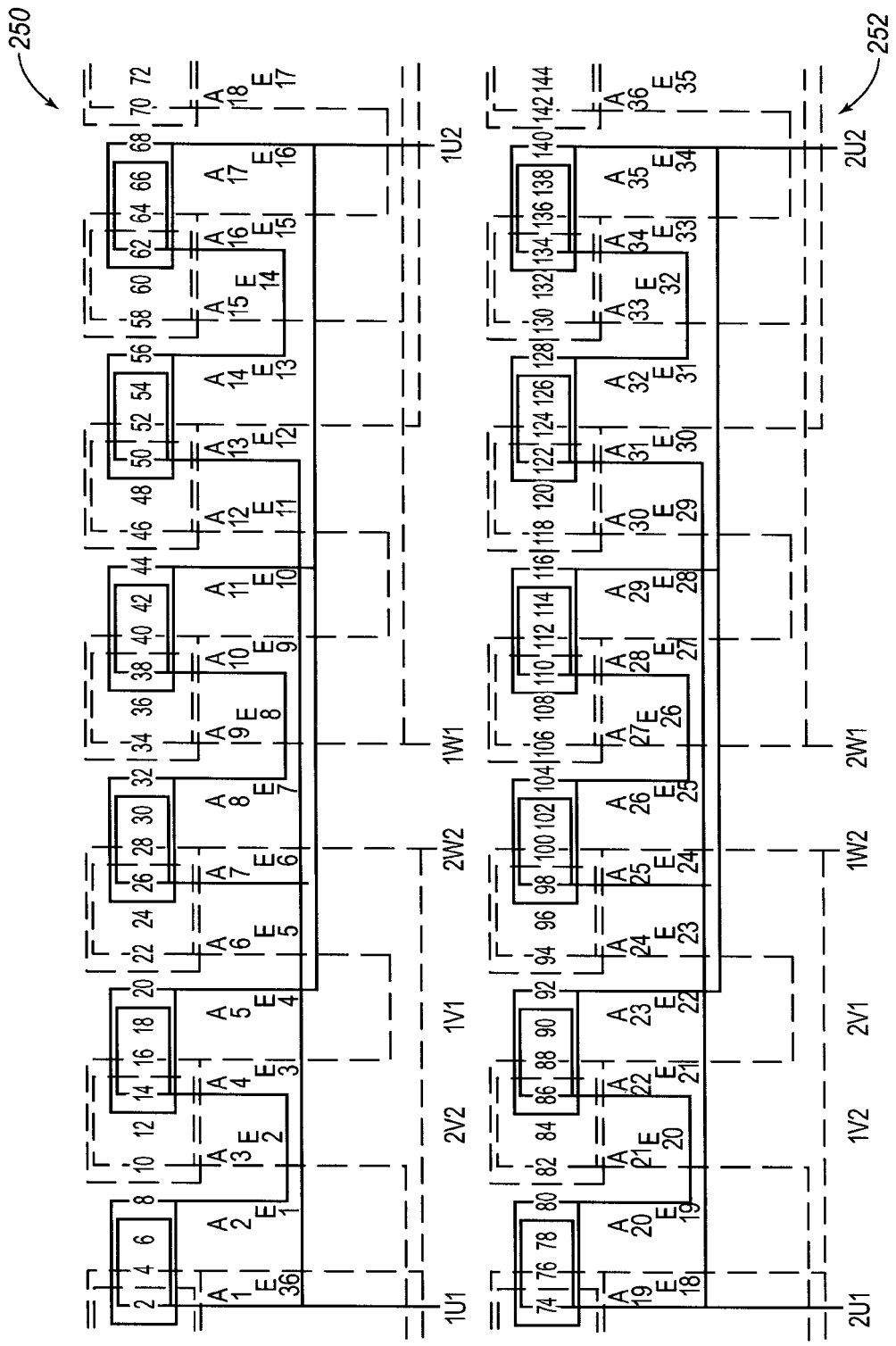
FIG. 9 is a winding diagram as used in the two speed permanent magnet motor of the present invention.

FIG. 9 is a schematic winding diagram showing the first set of windings 250 and the second set windings 252. FIG. 10 shows the connections between the first set of windings 250 and the second set of windings 252 when in a parallel connection. FIG. 11 shows the connections between the first set of windings 250 and the second set of windings 252 when in a series connection.

In the permanent magnet direct drive drawworks 200 of the present invention, the windings 250 and 252 have been provided in a configuration such that these can be connected for a nominal base voltage when in a series connection or connected for a nominal voltage of half that amount when placed in a parallel connection. These connections are selectable by manual selector switches, such as switches 204, 206, 208 or 210. Alternatively, they can be automatically chosen by way of a computer or by a processor controlled through the drilling control system.

When connected in a parallel arrangement, such as illustrated in FIG. 10, the frequency is increased to twice nominal. With rated current and nominal voltage applied, twice the nominal speed is achieved at the nominal power rating. In this manner, an effective two speed permanent magnet direct drive drawworks is achieved. Overspeed conditions above twice normal are still achievable based upon the particular drive manufacture's drive characteristics and performance.

The present invention utilizes an overspeed detector to open the power supply (i.e. the variable frequency drive system power circuit) and to instantaneously apply the dynamic braking resistors of the load bank 226 in order to absorb the kinetic energy of the rotating drum of the winch or drawworks that are produced from the potential energy of a weight or a load. This allows the ability to properly slow down the movement of the load under such conditions. As such, a maximum safe or speed limiter is provided relative to the associated load of the weight.

When in the paralleled connection of FIG. 10, the voltage of the motor windings will require half the nominal voltage. Therefore, by operation of twice-rated frequency and at rated voltage, the speed is twice the nominal value. This is because each of the paralleled windings will see double the nominal voltage. When in the series configuration of FIG. 11, with nominal voltage and nominal frequency applied, the speed is half that of the parallel connection (of FIG. 10). The frequency remains at nominal, but the power is constant. This produces nominal torque which is twice that of the paralleled connection (of FIG. 10).

During runaway conditions or overspeed conditions, the stator power terminals are immediately disconnected through power switches and connected to the load bank 226 or resistor network in order to absorb the lowering power and limit the top speed or maximum speed of the falling load. The typical overspeed devices that can sense these conditions can be encoders, mechanically-activated inertia switches, and similar devices. Due to the inherent characteristics of the field flux that is produced by the permanent magnet direct drive motor 202, this dynamic braking utilizes the driving motor itself as the braking device. As such, this limits equipment damage and increases personnel safety.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A direct drive drawworks comprising:
   a permanent magnet motor having a first set of windings and a second set of windings;
   a shaft extending from said permanent magnet motor such that said permanent magnet motor directly rotates said shaft;
   a drum connected to said shaft away from said permanent magnet motor such that the rotation of said shaft causes a corresponding rotation of said drum; and
   a switch cooperative with said first set of windings and said second set of windings so as to cause the sets of windings to be selectively connected in parallel or in series.

2. The direct drive drawworks of claim 1, further comprising:
   a processing means connected to said switch for switching between the parallel connection and the series connection relative to a condition.

3. The direct drive drawworks of claim 2, said condition being a load on said drum.

4. The direct drive drawworks of claim 3, said processing means for switching to the parallel connection when the load on said drum is at a first amount, said processing means for switching to the series connection when the load on said drum is a second amount, said second amount being greater than the first amount.

5. The direct drive drawworks of claim 1, further comprising:
   an AC power supply electrically connected to said permanent magnet motor.

6. The direct drive drawworks of claim 5, further comprising:
   a variable frequency drive electrically interconnected between said AC power supply and said permanent magnet motor.

7. The direct drive drawworks of claim 5, further comprising:
   a resistive load bank electrically interconnected between said AC power supply and said permanent magnet motor; and
   a transfer switch for directly electrically connecting said resistive load bank to said permanent magnet motor upon a condition occurring.

8. The direct drive drawworks of claim 7, said condition being an interruption of power from said AC power supply to said permanent magnet motor.

9. The direct drive drawworks of claim 7, said condition being an overload condition affecting said drum.

10. The direct drive drawworks of claim 7, said resistant load bank comprising dynamic braking resistors.

11. The direct drive drawworks of claim 1, said permanent magnet motor having a first speed when said switch connects the sets of windings in parallel, said permanent magnet motor having a second speed when said switch connects the sets of windings in series, said first speed being greater than said second speed.

12. The direct drive drawworks of claim 11, said first speed being approximately twice said second speed.

13. A two speed permanent magnet drive system comprising:
    a permanent magnet motor having a first set of windings and a second set of windings;
    a shaft extending from said permanent magnet motor such that said permanent magnet motor directly rotates said shaft, said permanent magnet motor comprising:
      a housing;
      a stator positioned in said housing; and
      a rotor cooperative with said stator, said rotor being either connected or interconnected to said shaft, said stator having said first set of windings and said second set of windings extending around an interior surface of said stator, said rotor being an annular member having a plurality of permanent magnets mounted in spaced relation around a periphery of said rotor; and
    a switch cooperative with said first set of windings and said second set of windings so as to cause the sets of windings to be selectively connected in parallel or in series.

14. The drive system of claim 13, said permanent magnet motor having a first speed when said switch connects the sets of windings in parallel, said permanent magnet motor having a second speed when said switch connects the sets of windings in series, said first speed being greater than said second speed.

15. The drive system of claim 13, further comprising:
    a processing means connected to said switch for switching between the parallel connection and the series connection relative to a condition.

16. The drive system of claim 13, further comprising:
    an AC power supply electrically connected to said permanent magnet motor;

a resistive load bank electrically interconnected between said AC power supply and said permanent magnet motor; and a transfer switch for directly electrically connecting said resistive load bank to said permanent magnet motor upon a condition occurring.

17. A direct drive drawworks comprising:

an AC power supply;

a permanent magnet motor electrically connected said AC power supply;

a shaft extending from said permanent magnet motor such that said permanent magnet motor directly rotates said shaft;

a drum connected to said shaft away from said permanent magnet motor such that said the rotation of said shaft causes a corresponding rotation of said drum;

a resistive load bank electrically interconnected between AC power supply and said permanent magnet motor; and a transfer switch for directly electrically connecting said resistive load bank to said permanent magnet motor upon a condition occurring.

18. The direct drive drawworks of claim 17, said permanent magnet motor having a first set of windings and a second set of windings, the direct drive drawworks further comprising:

a switch cooperative with said first set of windings and said second set of windings so as to cause the sets of windings to be selectively connected in parallel or in series.

19. The direct drive drawworks of claim 17, said condition being an interruption of power from said power supply to said permanent magnet motor.

20. The direct drive drawworks of claim 17, said resistant load bank comprising dynamic braking resistors.

* * * * *

UNITED STATES PATENT AND TRADEMARK OFFICE
CERTIFICATE OF CORRECTION

PATENT NO.       : 9,022,358 B2
APPLICATION NO.  : 13/821300
DATED            : May 5, 2015
INVENTOR(S)      : Kevin R. Williams Page 1 of 1

It is certified that error appears in the above-identified patent and that said Letters Patent is hereby corrected as shown below:

Title Page, Item 63, add the following paragraph:

Related U.S. Application Data

National Stage Entry of International Application No. PCT/US11/50622, filed September 7, 2011, which is a continuation of U.S. Application No. 12/876,673, filed September 7, 2010, which is itself a continuation in part of U.S. Application No. 12/643,439, filed December 21, 2009, (now U.S. Patent No. 8,672,059, issued March 18, 2014) which is itself a Nonprovisional Application which claims the benefit of U.S. Provisional Application No. 61/140,024, filed December 22, 2008.

Signed and Sealed this
Twenty-third Day of August, 2016

Michelle K. Lee
*Director of the United States Patent and Trademark Office*